United States Patent [19]
Miller et al.

[11] Patent Number: 6,068,875
[45] Date of Patent: *May 30, 2000

[54] METHOD FOR PREPARING A SLURRIED CONFECTION

[75] Inventors: Eric R. Miller, Deland; William Brown, Orlando, both of Fla.

[73] Assignee: Archibald Bros. Fine Beverages, Inc., Deland, Fla.

[*] Notice: This patent is subject to a terminal disclaimer.

[21] Appl. No.: 09/370,516

[22] Filed: Aug. 6, 1999

Related U.S. Application Data

[63] Continuation-in-part of application No. 09/097,111, Jun. 12, 1998, Pat. No. 5,948,461, which is a continuation of application No. 08/451,256, May 26, 1995, Pat. No. 5,766,665.

[51] Int. Cl.$^7$ .................................................. A23G 9/00
[52] U.S. Cl. ......................... 426/565; 426/519; 426/569; 99/516; 222/144.5; 366/198; 366/204; 366/347
[58] Field of Search ..................... 426/565, 569, 426/590, 519; 99/516; 366/197, 198, 204, 347, 289; 222/144.5

[56] References Cited

U.S. PATENT DOCUMENTS

| | | |
|---|---|---|
| D. 305,973 | 2/1990 | Barnard et al. . |
| D. 309,399 | 7/1990 | Barnard et al. . |
| D. 309,400 | 7/1990 | Barnard et al. . |
| D. 345,488 | 3/1994 | Barnard et al. . |
| D. 364,175 | 11/1995 | Alpers et al. . |
| 1,681,929 | 8/1928 | De Armond et al. . |
| 1,957,391 | 5/1934 | Costakos . |
| 2,051,883 | 8/1936 | Morgan . |
| 2,462,019 | 2/1949 | Bowman . |
| 2,707,911 | 5/1955 | Charpiat . |
| 2,712,887 | 7/1955 | King . |
| 2,736,274 | 2/1956 | Atkins . |
| 2,765,234 | 10/1956 | Schmitt et al. . |
| 2,855,007 | 10/1958 | Erickson et al. . |
| 3,106,895 | 10/1963 | Hood . |
| 3,276,633 | 10/1966 | Rahauser . |

(List continued on next page.)

*Primary Examiner*—Milton Cano
*Attorney, Agent, or Firm*—Allen, Dyer, Doppelt, Milbrath & Gilchrist, P.A.

[57] ABSTRACT

A method for preparing a flavored slurried confection includes the use of a disposable serving container holding an individual serving of a neutral flavored mix which has a freezing point temperature lower than normally found for that of water. A large supply of the mix filled containers is stored in a storage freezer for maintaining the neutral flavored mix at a storage temperature, such as is typical of a food storage freezer for a restaurant. A desired quantity of the mix filled containers is then transferred from the storage freezer to a tempering freezer, generally close to a preparation and serving area, for maintaining the neutral flavored mix at a desirable blending temperature. The mix filled container is then removed from the tempering freezer for preparation of a flavored confection, such as a flavored shake. In preparing the flavored confection, a small quantity of a selected syrup is pumped from a selected bag-in-the-box styled carton into the mix filled container for blending the selected syrup with the neutral flavored mix while the mix remains chilled at the blending temperature. The small quantity of syrup adds provides the selected flavor to the neutral flavored mix for forming the flavored slurried confection which is then served within the disposable serving container.

30 Claims, 4 Drawing Sheets

U.S. PATENT DOCUMENTS

| | | |
|---|---|---|
| 3,295,997 | 1/1967 | Tomlinson et al. . |
| 3,460,717 | 8/1969 | Thomas . |
| 3,830,407 | 8/1974 | Wierlo . |
| 3,934,759 | 1/1976 | Gianella et al. . |
| 3,987,715 | 10/1976 | Muller . |
| 4,580,905 | 4/1986 | Schwitters et al. . |
| 4,822,175 | 4/1989 | Barnard et al. . |
| 4,828,866 | 5/1989 | Wade et al. . |
| 4,881,663 | 11/1989 | Seymour . |
| 4,946,287 | 8/1990 | Barnard et al. . |
| 4,988,529 | 1/1991 | Nakaya et al. . |
| 5,056,686 | 10/1991 | Jarrett . |
| 5,152,429 | 10/1992 | Billings . |
| 5,159,818 | 11/1992 | Etou et al. . |
| 5,203,366 | 4/1993 | Czeck et al. . |
| 5,251,790 | 10/1993 | Cohn et al. . |
| 5,305,923 | 4/1994 | Kirschner et al. . |
| 5,306,083 | 4/1994 | Caldwell et al. . |
| 5,323,691 | 6/1994 | Reese et al. . |
| 5,341,957 | 8/1994 | Sizemore . |
| 5,464,120 | 11/1995 | Alpers et al. . |
| 5,553,749 | 9/1996 | Oyler et al. . |
| 5,766,665 | 6/1998 | Miller ...................................... 426/565 |
| 5,948,461 | 9/1999 | Miller ...................................... 426/565 |
| B1 5,056,686 | 10/1993 | Jarrett . |

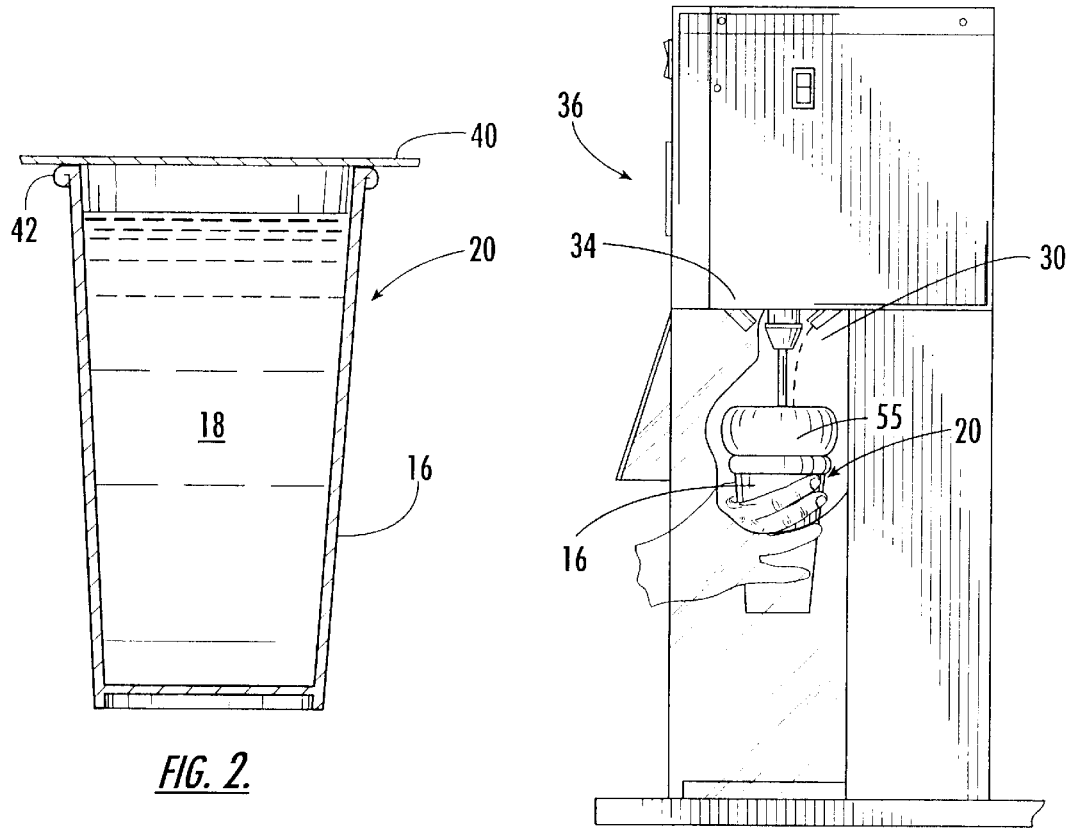
FIG. 2.
FIG. 3.
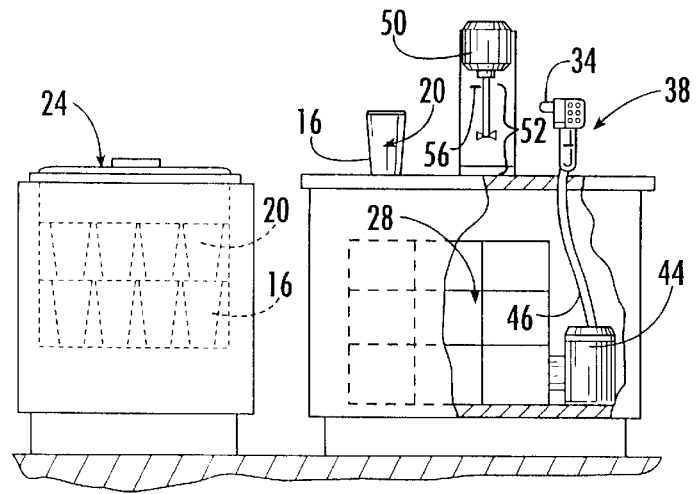
FIG. 4.

METHOD FOR PREPARING A SLURRIED CONFECTION

CROSS REFERENCE TO RELATED APPLICATIONS

This application is a continuation-in-part of application Ser. No. 09/097,111 filed on Jun. 12, 1998 for "Method And Apparatus For Preparing A Flavored Shake," now U.S. Pat. No. 5,948,461 which itself is a continuation of application Ser. No. 08/451,256 filed on May 26, 1995 for "Multi-Flavored Comestible Shake Mixing Method" issuing as U.S. Pat. No. 5,766,665 for "Method Of Preparing A Multi-Flavored Comestible Shake," all commonly owned with the present invention.

FIELD OF THE INVENTION

The present invention relates generally to the dispensing and mixing of multi-flavored drinks such as milkshakes, frozen custards, slushes and the like, and more particularly to an efficient and cost effective method of preparing a flavored shake.

BACKGROUND OF THE INVENTION

Beverage dispensing systems are used to provide consumers with beverages that are typically a mixture of previously stored concentrate and water. Further, milk shake machines are available for use in fast-food styled restaurants, but such machines are typically expensive. In addition, storage of product used is typically within the machine thus demanding expensive retail space for placement and convenient use.

By way of example, U.S. Pat. No. 5,056,686 to Jarrett discloses a beverage dispensing system for providing different flavored drinks mixed from concentrate and water. Containers including the different flavors of concentrate are stored for pumping to a hand held, "bar-gun" styled, dispensing nozzle. Valves within the dispensing head control the concentrate discharge when a selected beverage is desired, and an appropriate amount of concentrate and water are discharged simultaneously to ensure that the end beverage contains the desired mixture. User operated vending machines, such as that described in U.S. Pat. No. 5,341,957 to Sizemore, discloses a cup-type vending system which includes a currency output device and automatically outputs a beverage into a cup in response to a payment and selection of a beverage. The vending machine includes a plurality of disposable containers of beverage syrup, such as "bag-in-box" packages, stored in an auxiliary cabinet. A dispensing system functions to draw syrup from the disposable containers and selectively dispense a predefined or selected amount of syrup into an awaiting cup. The system includes pumping stages wherein one stage draws a selected amount of syrup from a package through a feed conduit and discharges the selected amount through a nozzle into the cup.

By way of further example, U.S. Pat. No. 3,295,997 to Tomlinson et al. discloses a milk shake machine which include a mixer for reducing pre-frozen flavored ingredients stored within a container to a flavored milk shake with the addition of a preselected amount of milk supplied from a milk storage tank carried by the machine. U.S. Pat. No. 5,323,691 to Reese et al. discloses a frozen drink mixer for preparing blended beverages, particularly frozen drinks, in which an ice dispenser, liquid mix dispenser, and blender are combined into a single unit. The apparatus automatically delivers an appropriate amount of ice and liquid to the blender unit and turns on the blender at an appropriate time to prepare the frozen drink of desired size. A drink mixing and dispensing machine described in U.S. Pat. No. 2,855,007 stores a mix within a tank carried by the machine and pumps the mix through a freezing chamber prior to dispensing into a cup which is held under a mixing blade. Syrup pumps are also carried within the cabinet of the machine for dispensing one or two syrups into the cup before repositioning the cup under the mixer for dispensing and mixing the syrup with the milk shape styled mix.

While a variety of milk shake styled syrup dispensing and mixing devices and methods are known in the art, there remains a need for an economical method for efficiently and cost effectively providing a customer with a plurality of options for a milk shake flavored as desired by the customer.

SUMMARY OF INVENTION

In view of the foregoing background, it is an object of the present invention to provide an efficient method of preparing a flavored confection such as a non-dairy milk shake within health conscience standards. As is well known, strict sanitation codes and enforcement of these codes creates a need for improved and simplified food dispensing methods. It is further an object of the present invention to provide a variety of flavors while minimizing storage and expanding accessibility for such flavors. It is another object to use such flavors with a neutral flavored mix for use as a base to which selected flavors are dispensed. It is yet another object of the invention to minimize inventory needs typical in an ice cream counter styled restaurant and improve on the speed of service for such a restaurant. It is yet another object of the present invention to provide such a method at a cost well below that associated with current methods that include typically expensive storage and processing equipment.

These and other objects, advantages and features of the present invention are provided by a method for preparing a flavored slurried confection which comprises providing a disposable serving container and depositing a neutral flavored mix into the container for storage prior to the preparation of the confection. It is desirable that the neutral flavored mix have a freezing point temperature lower than normally found for that of water. It is further desired that the mix filled container is stored within a storage freezer for maintaining the neutral flavored mix at a storage temperature, and transferred to a tempering freezer generally close to a preparation and serving area for maintaining the neutral flavored mix at a blending temperature. The mix filled container is removed from the tempering freezer for preparation of a flavored confection. In order to provide a variety of flavored for selection by a customer, a plurality of flavored syrups is provided. In the preparation of the confection, the mix filled container is manually positioning for pumping a selected syrup into the container. The syrup is selected from the plurality of flavored syrups, and a small quantity is pumped into the mix filled container for blending the selected syrup with the neutral flavored mix. During the blending, the mix preferably remains chilled, whereby the small quantity of syrup adds a selected flavor to the body and mass of the neutral flavored mix for forming the flavored slurried confection within the disposable serving container. The flavored slurried confection is then served within the disposable serving container for consumption in that same disposable serving container.

In a preferred embodiment, the plurality of flavored syrups are stored in bag-in-a-box styled packages. In an alternate preparation and serving method, an open ended tubular sleeve is attached to the mix filled container prior to pumping the syrup. The open ended tubular sleeve extends walls of the container for limiting splashing of the mix during blending, and may comprise inserting the sleeve into the container, or attaching the sleeve about a lip of the container, as desired. The sleeve may remain or be removed prior to serving the prepared confection.

BRIEF DESCRIPTION OF DRAWINGS

A preferred embodiment of the invention as well as alternate embodiments are described by way of example with reference to the accompanying drawings in which:

FIG. 2 is a partial cross-sectional view of a mix filled container;

FIG. 3 is a side elevation view of a flavor injected blending apparatus;

FIGS. 4 and 5 are diagrammatical styled cut-away elevation and top views of an alternate system of the present invention;

DETAILED DESCRIPTION OF PREFERRED EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
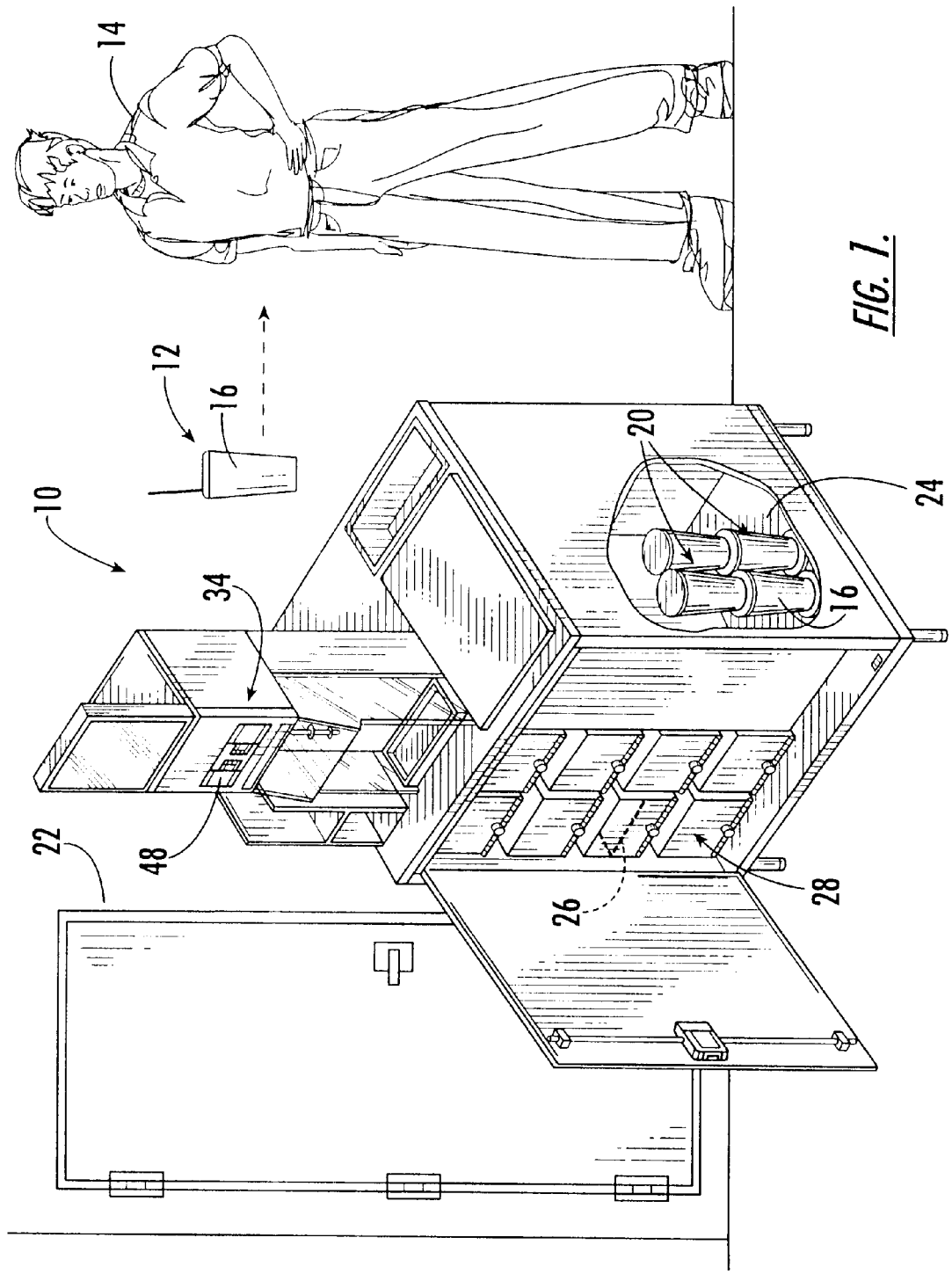
FIG. 1 is a perspective view of a slurried confection system of the present invention.

One preferred method of the present invention comprises a system 10 and process for preparing a flavored slurried confection 12, such as a shake, for serving to a customer 14 in a disposable serving container 16, such as a cup, wherein the serving container is effectively and efficiently used throughout the preparation process, as illustrated by way of example, with reference to FIG. 1. Preferably, the disposable serving container 16 is sufficiently sized for holding an individual serving of the slurried confection 16 therein. The present invention includes depositing a neutral flavored mix 18 into the disposable serving container 16, herein referred to as a mix filled container 20, as illustrated with reference to FIG. 2, wherein the neutral flavored mix preferably has a freezing point temperature lower than normally found for that of water. A reasonable supply of mix filled disposable serving containers will generally be stored in an on-premises storage freezer 22, such as a walk-in styled freezer as illustrated with reference again to FIG. 1, for maintaining the neutral flavored mix at a desirable storage temperature with a supply typically sufficient for accommodating sales of the confection between shipments of the mix filled containers from a supplier. Preferably, and as illustrated with reference again to FIG. 1, a quantity of the mix filled containers 20 are transferred from the storage freezer 22 to a tempering freezer 24 for maintaining the neutral flavored mix at a blending temperature. The mix filled containers 20 are then removed from the tempering freezer 24 for preparation of the flavored confection 12.

It has been shown that a blending temperature below the freezing temperature of water and generally about −15° C. Further, it is desirable to have the neutral mix be such that it contains and have air suspended therein for providing a desired texture to the mix and better manipulating of the mix during blending with syrups and syrup styled flavorings. With such, a desirable non-dairy sorbet, frappe, shake, and the like are produced and enhanced by the variety of flavor selection made available to the customer at a attractive price. It is expected that syrups will include various puree, sugared and solid particles such as chopped fruits and the like.

Figure 5:
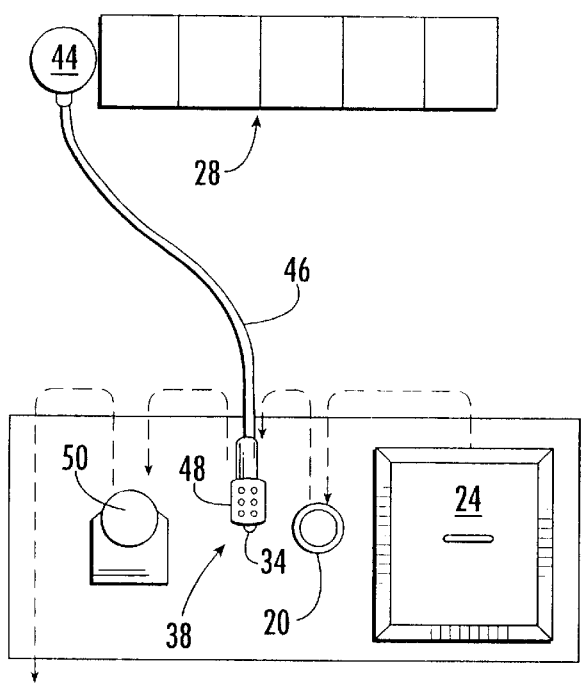

As illustrated with reference to FIG. 3, and again to FIG. 1, a plurality of flavored syrups 26 are stored in bag-in-the-box styled packages 28 for pumping a selected syrup 30 and dispensing the selected syrup into the mix filled container 20. Whether using a dispenser 34 from a flavor injected blending apparatus 36, illustrated by way of example with reference again to FIGS. 1 and 3, or a bar-gun apparatus 38, as illustrated with reference to FIGS. 4 and 5, the mix filled container 20 is held and a desired flavored syrup manually selected from the plurality of flavored syrups 26 available for pumping from the packages 28. Preferably, a small quantity of the selected syrup 30 is pumped into the mix filled container 20 for blending the selected syrup with the neutral flavored mix 18 while the mix remains chilled, whereby the small quantity of syrup adds a selected flavor to the body and mass of the neutral flavored mix for forming the flavored slurried confection 12 within the disposable serving container 18. As earlier described with reference to FIG. 1, the flavored slurried confection 12 is then served for consumption within the disposable serving container 16.

As illustrated with reference again to FIGS. 1 and 2, a lid 40 is attached to the mix filled container 20 for sealing the neutral flavored mix therein during storage. With such an arrangement, handling the mix filled container 20 is done within strict health code standards and with little fear of contaminating the pre-packaged neutral flavored mix 18. It is anticipated, as is illustrated with reference again to FIG. 2, that a flexible foil styled lid will be sealed along the container mouth or lip 42. The lid 40, in such an embodiment, extends beyond the lip 42 for ease in handling, pealing from the mix filled container 20, and disposal in a manner meeting desirable cleanliness and efficiency consistent with objects of the present invention.

As described earlier with reference to FIGS. 1 and 4, bag-in-box styled packages 28 are preferably used to store the various flavored syrups 26. The syrups 26 are individually pumped through dedicated pumps 44 and conduit 46 to the dispenser 34 for selecting a desired syrup and dispensing the selected syrup 30 into the mix filled container 20 for blending the selected syrup or multiple selected syrups with the neutral flavored mix 18. As is typical on bar gun apparatus 38, and flavor injected blending apparatus 36, syrup flavor selector buttons 48 provide for the selection of a desired syrup to be dispensed after delivery from an appropriate package 24 having the selected syrup 26. The contents, a variety of flavored syrups 26, of each package 24 is in fluid communication with the dispenser 34, a bar gun styled dispenser typically used to select and dispense liquor drinks and mixed soda drinks in combination with a preset amount of injected water. Once a particular flavored syrup 26 has been identified, an appropriate button 48 on the dispenser 34 is pushed which causes the pump 44 dedicated to that syrup 26 to pump the selected syrup 30 from its individual package 28 through conduit 46 in fluid communication with its individual pump. Typically one push of the selector button 48 insects a preset amount of syrup, two button pushes injects a doubled amount. In this way, customized, multi-flavored shake ingredients are readied for blending into the confection of choice. Further, a combination of flavors can be injected into the mix filled container 20 depending on the needs of customer.

Figure 6:
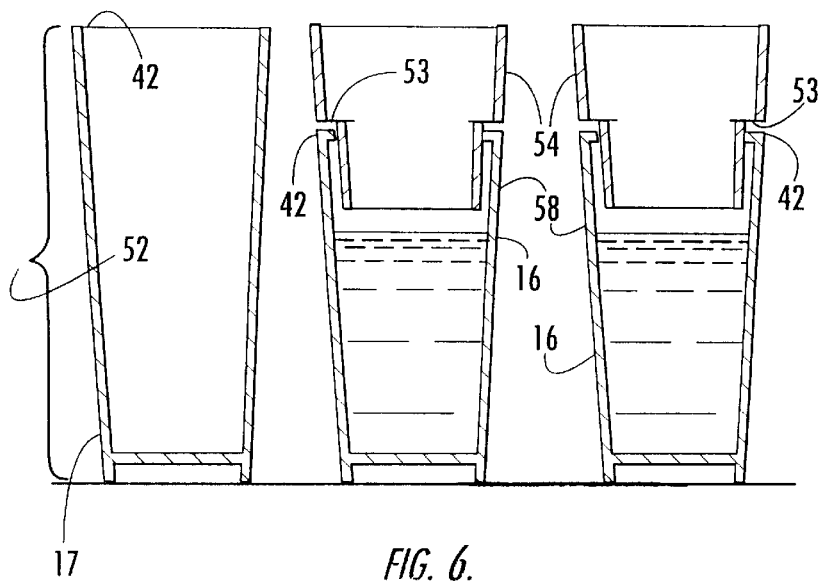
FIG. 6 is a partial elevation view illustrating a sleeve inserting step of the present invention.

As described in the above referenced related applications, the disclosure of which is herein incorporated by reference, it is well known in the soda fountain art to use a mixer 50 that includes a mixing cup, typically made of metal for preparing a milk shake or similar confection. Once prepared within the mixing cup, the flavored shake is then poured into a serving cup. More often than not, more mixed shake is prepared than needed to accommodate the amount of shake ordered. Further, the typical mixer 50 has a preset height dimension 52, so that a switch 56 can be activated for the blending process, while the mixing cup is held between the switch and a hook upon which a bottom portion of the cup is placed, as described in U.S. Pat. No. 5,766,665. To accommodate use with the blender 50, having the preset height dimension 52, a containers 17 having an appropriate height can be used, as illustrated with reference to FIG. 6. In the alternative, an open ended tubular sleeve 54 is inserted into the container 16 at various depths 58, as illustrated with reference to FIG. 6.

Figure 7:
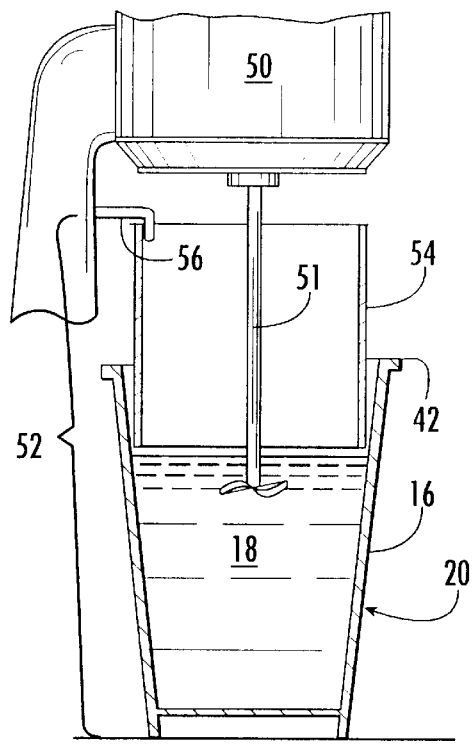
FIG. 7 is a partial cross-sectional view of a cylindrical sleeve in combination with a cup having a tapered side wall.

One embodiment of the present invention includes attaching the open ended tubular sleeve 54 to the mix filled container 20 prior to dispensing syrup for extending walls of the container sufficiently above the lip 42 for limiting splashing of the mix out of the container during blending, as illustrated with reference to FIG. 7. The embodiment of the sleeve 54, described in the related references, include attaching the sleeve 54 by inserting the sleeve into the container 16. The sleeve 54 enters at least partially into the container 20 and is held in place by container inside walls. The sleeve 54 is dimensioned for passing into the mix filled container 20, and depending on the container opening and taper within the container walls, the sleeve 54 will rest against an inner surface of the container.

As illustrated with reference again to FIG. 6, the sleeve 54 may have a tapered side wall allowing effective use with parallel walled containers. Further, the sleeve 54 may include a step for receiving the container lip 42. Alternatively, for containers having smaller openings, the tapered wall of the sleeve 54 will contact the lip 42 and be held in place for the blending step. The sleeve 54 extends sufficiently above the container lip 42 to prevent splashing out of the container and onto the surrounding counter where the confection is being prepared. The sleeve 54 may also include a step 53 that provides a height dimension such that the combination of sleeve and container can be used in a standard manner with the well known mixer 50.

Figure 8:
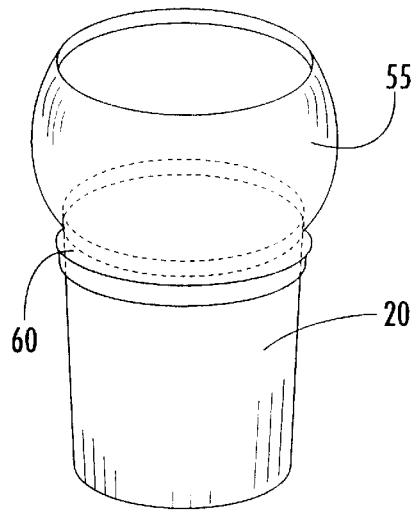
FIGS. 8 and 9 are perspective and cross-section views of a bulbous shaped sleeve of the present invention attached to a container.
Figure 9:
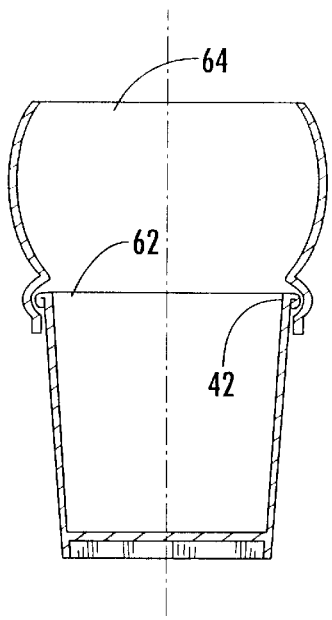
Figure 10:
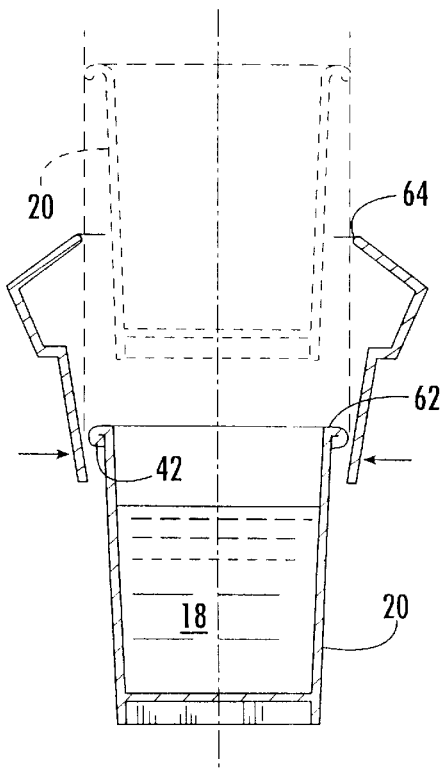
FIG. 10 is a cross-section view of an alternate bulbous shaped sleeve illustrating attaching onto a container.

In an alternate embodiment, a bulbous shaped sleeve 55, illustrated with reference to FIGS. 8 and 9, includes a flanged portion 60 which receives the lip 42 in a locking arrangement, and thus attaching the sleeve 55 comprises attaching the sleeve about the lip, wherein the lip defines an opening 62 of the container. In addition, the sleeve 55 comprises includes a top most opening 64 sufficient for passing the container 20 therethrough, as illustrated with reference to FIG. 10. As illustrated with reference again to FIGS. 9 and 10, various shaped contours may form the sleeve 55, without departing from the feature allowing the container 20 to be passed through the opening 64 and have the lip 42 snap into locking position within the flanged portion 60.

With the sleeve 54, blending is completed as illustrated with reference again to FIG. 7, having an appropriately sized container 16 and sleeve 34 combination inserted into the mixer 50 for blending of the ingredients using the motor driven mixing blade 51. It is anticipated that containers having 20, 16 and 12 ounce capacities will be used to serve flavored shakes. Once the blending is completed, the sleeve 54 will preferably be removed for serving the shake. A disposable sleeve may be used, or a sleeve used that can be washed for reuse.

Figure 11:
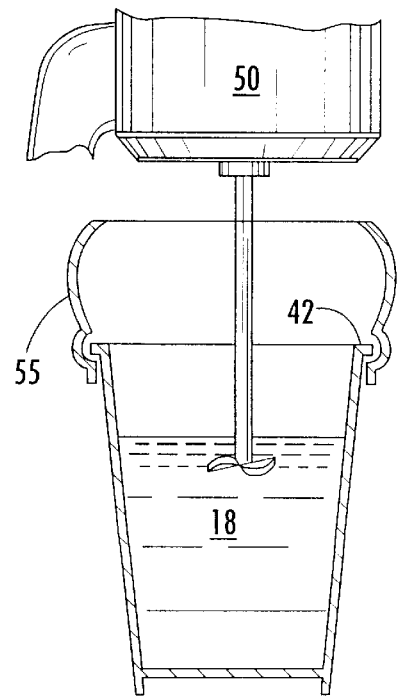
FIG. 11 is a partial cross-section view of the sleeved container held for blending a syrup with a mix.

The present invention is effectively used for a variety of confections. It is expected that the bulbous shaped sleeve 55, as described with reference to FIGS. 3 and 11, will be used for such varieties as a whipped cream topped dessert, in which case the sleeve 55 will likely remain attached to the container when the confection 12 is served. Generally, the sleeve 55 will be attached as described with reference again to FIG. 10, and hand held during the blending of the syrup with the mix. Such an arrangement allows for ease and convenience in handling of the mix filled containers 20 and sleeve 55 in an effective and timely manner.

As a result of the present invention, a cost effective, health code conscience process fro providing a slurried confection having a desired flavored is provided. While specific steps in the invention have been described in detail herein above, it is to be understood that various modifications may be made from the specific details described herein without departing from the spirit and scope of the invention as set forth in the appended claims. Having now described the invention, the construction, the operation and use of preferred embodiments thereof, and the advantageous new and useful results obtained thereby, the new and useful methods and reasonable equivalents thereof obvious to those skilled in the art, are set forth in the appended claims.

What is claimed is:

1. A method for preparing a flavored slurried confection, the method comprising the steps of:

providing a disposable serving container sufficiently sized for holding an individual serving of a slurried confection therein;

depositing a neutral flavored mix into the container, wherein the neutral flavored mix has a freezing point temperature lower than normally found for that of water;

storing the mix filled container within a storage freezer for maintaining the neutral flavored mix at a storage temperature;

maintaining the neutral flavored mix within the mix filled container at the storage temperature within the storage freezer;

transferring the mix filled container from the storage freezer to a tempering freezer for maintaining the neutral flavored mix at a blending temperature;

maintaining the neutral flavored mix within the mix filled container at the blending temperature within the tempering freezer;

removing the mix filled container from the tempering freezer for preparation of a flavored confection;

providing a plurality of flavored syrups;

manually positioning the mix filled container for pumping a selected syrup therein;

holding the mix filled container;

manually selecting a syrup from the plurality of flavored syrups;

pumping a quantity of the selected syrup into the mix filled container for blending the selected syrup with the neutral flavored mix;

blending the selected syrup with the neutral flavored mix while the mix remains chilled, whereby the quantity of syrup adds a selected flavor to the neutral flavored mix for forming the flavored slurried confection within the disposable serving container; and manually serving the flavored slurried confection for consumption within the disposable serving container.

2. The method according to claim 1, further comprising the step of attaching a lid onto the container for sealing the neutral flavored mix therein during the storage of the mix filled container.

3. The method according to claim 1, wherein the step of providing a plurality of flavored syrups comprises the step of storing each of the plurality of flavored syrups in a bag-in-a-box styled package.

4. The method according to claim 1, further comprising the step of attaching an open ended tubular sleeve to the mix filled container prior to the syrup pumping step, the open ended tubular sleeve extending walls of the container for limiting splashing of the mix during the blending step.

5. The method according to claim 4, wherein the sleeve attaching step comprises the step of inserting the sleeve into the container.

6. The method according to claim 4, wherein the sleeve attaching step comprises the step of attaching the sleeve about a lip of the container, wherein the lip defines an opening of the container and the sleeve comprises at least one open end having an opening sufficient for passing the container therethrough.

7. The method according to claim 1, wherein the container comprises a drinking-styled cup.

8. The method according to claim 1, wherein the blending step comprises the steps of:

providing a mixer having a mixing blade; and inserting the mixing blade into the container while manually holding the mix filled container.

9. The method according to claim 1, wherein the neutral flavored mix comprises a neutral flavored shake mix, and wherein the flavored slurry confection comprises a flavored shake.

10. The method according to claim 1, wherein the blending temperature comprises a temperature of less than zero degrees Centigrade.

11. The method according to claim 1, wherein the mix filled container storing step comprises the step of storing a plurality of mix filled containers.

12. A method for preparing a flavored confection, the method comprising the steps of:

providing a disposable serving container;

depositing a neutral flavored mix into the container;

storing the mix filled container at a desirable temperature;

providing a plurality of flavored syrups;

manually positioning the mix filled container for pumping a selected syrup therein;

selecting a syrup from the plurality of flavored syrups;

pumping a quantity of the selected syrup into the mix filled container for blending the selected syrup with the neutral flavored mix;

blending the selected syrup with the neutral flavored mix while the mix remains chilled, whereby the quantity of syrup adds a selected flavor to the neutral flavored mix for forming the flavored confection within the disposable serving container; and manually serving the flavored confection for consumption within the disposable serving container.

13. The method according to claim 12, wherein the neutral flavored mix has a freezing point temperature lower than normally found for that of water.

14. The method according to claim 12, wherein the mix filled container storing step comprises the steps of:

storing the mix filled container in a storage freezer for first maintaining the neutral flavored mix at a storage temperature;

transferring the mix filled container from the storage freezer to a tempering freezer for then maintaining the neutral flavored mix at a blending temperature; and removing the mix filled container from the tempering freezer for preparation of the flavored slurried confection.

15. The method according to claim 14, wherein the blending temperature comprises a temperature of less than zero degrees Centigrade.

16. The method according to claim 12, further comprising the step of attaching a lid onto the container for sealing the neutral flavored mix therein during the storage of the mix filled container.

17. The method according to claim 12, wherein the step of providing a plurality of flavored syrups comprises the step of storing each of the plurality of flavored syrups in a bag-in-a-box styled package.

18. The method according to claim 12, further comprising the step of attaching an open ended tubular sleeve to the container prior to the syrup pumping step, the open ended tubular sleeve extending walls of the container for limiting splashing of the mix during the blending step.

19. The method according to claim 18, wherein the sleeve attaching step comprises the step of inserting the sleeve into the container.

20. The method according to claim 18, wherein the sleeve attaching step comprises the step of attaching the sleeve about a lip of the container, wherein the lip defines an opening of the container and the sleeve comprises at least one open end having an opening sufficient for passing the container therethrough.

21. The method according to claim 12, wherein the neutral flavored mix comprises a neutral flavored shake mix, and wherein the flavored slurry confection comprises a flavored shake.

22. The method according to claim 12, wherein the mix filled container storing step comprises the step of storing a plurality of mix filled containers.

23. A method for preparing a flavored confection, the method comprising the steps of:

providing a plurality of flavored syrups;

manually positioning a disposable serving container for pumping a selected syrup therein, the disposable container having a neutral flavored mix stored at a chilled temperature therein;

selecting a syrup from the plurality of flavored syrups;

pumping a quantity of the selected syrup into the mix filled container for blending the selected syrup with the neutral flavored mix;

blending the selected syrup with the neutral flavored mix while the mix remains chilled, whereby the quantity of syrup adds a selected flavor to the neutral flavored mix for forming the flavored confection within the disposable serving container; and manually serving the flavored confection for consumption within the disposable serving container.

24. The method according to claim 23, wherein the neutral flavored mix has a freezing point temperature lower than normally found for that of water.

25. The method according to claim 23, further comprising the steps of:

storing the mix filled container in a storage freezer for first maintaining the neutral flavored mix at a storage temperature;

transferring the mix filled container from the storage freezer to a tempering freezer for then maintaining the neutral flavored mix at a blending temperature; and removing the mix filled container from the tempering freezer for preparation of the flavored confection, wherein the blending temperature comprises the chilled temperature.

26. The method according to claim 25, wherein the blending temperature comprises a temperature of less than zero degrees Centigrade.

27. The method according to claim 23, further comprising the steps of:

attaching an open ended tubular sleeve to the container prior to the syrup pumping step, the open ended tubular sleeve extending walls of the container for limiting splashing of the mix during the blending step; and removing the sleeve prior to the serving step.

28. The method according to claim 27, wherein the sleeve attaching step comprises the step of inserting the sleeve into the container.

29. The method according to claim 27, wherein the sleeve attaching step comprises the step of attaching the sleeve about a lip of the container, wherein the lip defines an opening of the container.

30. The method according to claim 23, wherein the neutral flavored mix comprises a neutral flavored shake mix, and wherein the flavored slurry confection comprises a flavored shake.

* * * * *